(12) United States Patent
Lee et al.

(10) Patent No.: US 8,611,687 B2
(45) Date of Patent: Dec. 17, 2013

(54) METHOD AND APPARATUS FOR ENCODING AND DECODING IMAGE USING FLEXIBLE ORTHOGONAL TRANSFORM

(75) Inventors: Kyo-hyuk Lee, Yongin-si (KR); Jong-bum Choi, Suwon-si (KR); Min-su Cheon, Suwon-si (KR); Jianle Chen, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 634 days.

(21) Appl. No.: 12/859,614

(22) Filed: Aug. 19, 2010

(65) Prior Publication Data
US 2011/0044551 A1  Feb. 24, 2011

(30) Foreign Application Priority Data
Aug. 19, 2009 (KR) .................. 10-2009-0076734

(51) Int. Cl.
*G06K 9/36* (2006.01)
(52) U.S. Cl.
USPC ........................................................ 382/238

(58) Field of Classification Search
USPC ................. 382/232–251; 375/240.01–240.29
See application file for complete search history.

(56) References Cited

U.S. PATENT DOCUMENTS

| | | | |
|---|---|---|---|
| 7,912,129 B2 * | 3/2011 | Zhang ..................... 375/240.17 |
| 8,086,052 B2 * | 12/2011 | Toth et al. ..................... 382/236 |
| 8,094,714 B2 * | 1/2012 | Nakazato et al. ........ 375/240.01 |
| 2006/0251330 A1 * | 11/2006 | Toth et al. ..................... 382/236 |
| 2007/0019872 A1 * | 1/2007 | Birinov et al. ................. 382/236 |
| 2008/0049834 A1 | 2/2008 | Holcomb et al. |
| 2008/0198928 A1 | 8/2008 | Fujisawa et al. |
| 2008/0310512 A1 * | 12/2008 | Ye et al. ................... 375/240.16 |
| 2011/0170790 A1 * | 7/2011 | Cheon et al. .................. 382/233 |

* cited by examiner

*Primary Examiner* — Ishrat I Sherali
(74) *Attorney, Agent, or Firm* — Sughrue Mion, PLLC

(57) ABSTRACT

A method and apparatus for encoding an image by freely combining a plurality of prediction schemes and a plurality of orthogonal transform schemes based on grouping and matching of the plurality of prediction schemes and the plurality of orthogonal transform schemes is provided.

21 Claims, 8 Drawing Sheets

FIG. 3A

```
NUM_PRED_GROUP
for(n=0 ; n < NUM_PRED_GROUP; n++){
    NUM_PREDUNIT_IN_GROUP[n]
    for(i=0 ; i < NUM_PREDUNIT_IN_GROUP[n]; i++)
        USED_PRED_UNIT[n][i]
}
```

FIG. 3B

```
NUM_TRANS_SET
for(n=0 ; n < NUM_TRANS_SET; n++){
    NUM_TRANS_IN_SET[n]
    for(i=0 ; i < NUM_TRANS_IN_SET[n]; i++)
        USED_TRANSFORM[n][i]
}
```

FIG. 3C

```
for(n=0 ; n < NUM_PRED_GROUP; n++){
    TRANSFORM_SET_MATCHING[n]
}
```

METHOD AND APPARATUS FOR ENCODING AND DECODING IMAGE USING FLEXIBLE ORTHOGONAL TRANSFORM

CROSS-REFERENCE TO RELATED PATENT APPLICATION

This application claims priority from Korean Patent Application No. 10-2009-0076734, filed on Aug. 19, 2009, in the Korean Intellectual Property Office, the disclosure of which is incorporated herein in its entirety by reference.

BACKGROUND

1. Field

Apparatuses and methods consistent with the exemplary embodiments generally relate to encoding and decoding an image, and more particularly, to a method and apparatus for encoding an image using an orthogonal transform.

2. Description of the Related Art

A codec such as Moving Pictures Experts Group (MPEG)-4 H.264/MPEG-4 Advanced Video Coding (AVC) performs prediction encoding of an image using intra or inter prediction. For the inter prediction, an image encoding apparatus generates a prediction block by searching a reference picture for a block identical or similar to a current block and performing motion compensation of the current block based on the searching result. For the intra prediction, an image encoding apparatus generates a prediction block by using a value of pixels included in a previously encoded area adjacent to a current block.

Once the prediction block is generated, a residual block is generated by subtracting the prediction block from the current block, and an orthogonal transform is performed on the generated residual block. The orthogonal transform may include a Discrete Cosine Transform (DCT).

SUMMARY OF THE EXEMPLARY EMBODIMENTS

The exemplary embodiments provide a method and apparatus for encoding and decoding an image using an orthogonal transform, and a computer readable recording medium having embodies thereon a computer readable program for executing the method.

According to an aspect of the exemplary embodiments, there is provided a method for encoding an image, the method including: generating at least one group on prediction (or prediction group) by grouping a plurality of prediction schemes; generating at least one group on orthogonal transform (or orthogonal transform group) by grouping a plurality of orthogonal transform schemes; matching the at least one group on prediction to the at least one group on orthogonal transform; and encoding an input image by transforming a block predicted by a prediction scheme of a predetermined group on prediction using an orthogonal transform scheme of a group on orthogonal transform, which is matched to the predetermined group on prediction, based on the matching.

The generating of at least one group on prediction may include generating the at least one group on prediction by grouping the plurality of prediction schemes based on at least one of the size of a prediction block and a type of prediction scheme.

The type of prediction scheme may include intra prediction and inter prediction.

The generating of at least one group on orthogonal transform may include generating the at least one group on orthogonal transform by grouping the plurality of orthogonal transform schemes based on at least one of the size of a transform block and a transform algorithm.

The transform algorithm may include a Discrete Cosine Transform (DCT) and a Hadamard transform.

The matching may include matching the at least one group on prediction to the at least one group on orthogonal transform based on the size of a prediction block and the size of a transform block.

The matching may be performed in a unit of image sequence, picture, slice, or Instantaneous Decoding Refresh (IDR).

The encoding may include encoding information regarding matching between the at least one group on prediction and the at least one group on orthogonal transform.

According to another aspect of the exemplary embodiments, there is provided a method for decoding an image, the method including: receiving a bitstream of a predetermined output image; decoding information regarding matching between at least one group on prediction and at least one group on orthogonal transform; and decoding the output image by predicting a block inverse-orthogonally transformed by a transform scheme of a predetermined group on orthogonal transform using a prediction scheme of a matched group on prediction based on the matching.

According to another aspect of the exemplary embodiments, there is provided an apparatus for encoding an image, the apparatus including: an image encoder for encoding an input image; and a matching unit for matching at least one group on prediction to at least one group on orthogonal transform and encoding the input image by transforming a block predicted by a prediction scheme of a predetermined group on prediction using an orthogonal transform scheme of a group on orthogonal transform, which is matched to the predetermined group on prediction, based on the matching.

According to another aspect of the exemplary embodiments, there is provided an apparatus for decoding an image, the apparatus including: an image decoder for decoding a bitstream of an output image; and a matching unit for decoding the output image by predicting a block inverse-orthogonally transformed by a transform scheme of a predetermined group on orthogonal transform by the image decoder using a prediction scheme of a matched group on prediction based on information regarding matching between at least one group on prediction and at least one group on orthogonal transform, which are included in the bitstream.

According to another aspect of the exemplary embodiments, there is provided a computer readable recording medium having embodied thereon a computer readable program for executing the method for encoding an image and the method for decoding an image.

BRIEF DESCRIPTION OF THE DRAWINGS

The above and other aspects will become more apparent by describing in detail exemplary embodiments thereof with reference to the attached drawings in which:

FIGS. 3A to 3C illustrate syntaxes for matching between at least one group on prediction and at least one group on orthogonal transform, according to an exemplary embodiment;

DETAILED DESCRIPTION OF THE EXEMPLARY EMBODIMENTS

The exemplary embodiments will now be described more fully with reference to the accompanying drawings, in which exemplary embodiments are shown.

Figure 1:
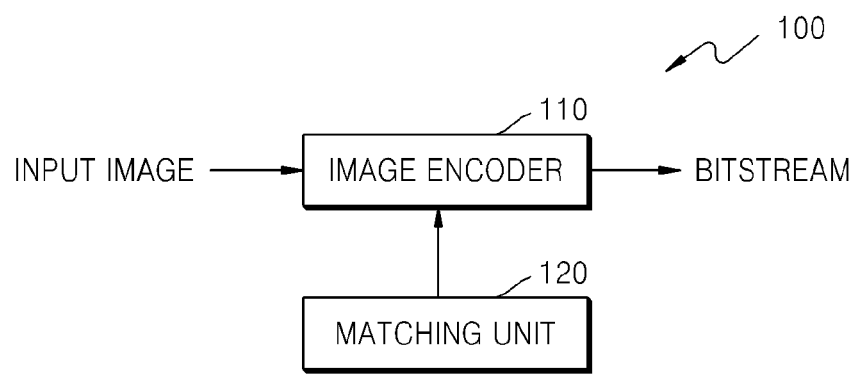
FIG. 1 is a block diagram of an image encoding apparatus according to an exemplary embodiment.

FIG. 1 is a block diagram of an image encoding apparatus 100 according to an exemplary embodiment.

Referring to FIG. 1, the image encoding apparatus 100 includes an image encoder 110 and a matching unit 120.

The image encoder 110 receives and encodes an input image. The image encoder 110 encodes the input image based on information regarding matching between a group on prediction and a group on orthogonal transform, which is generated by the matching unit 120, as will be described later with reference to FIGS. 2A to 2C and 3.

The matching unit 120 generates at least one group on prediction by grouping a plurality of prediction schemes and generates at least one group on orthogonal transform by grouping a plurality of orthogonal transform schemes. Hereinafter, the group on prediction is called a prediction group, and the group on orthogonal transform is called an orthogonal transform group.

Figure 2A:
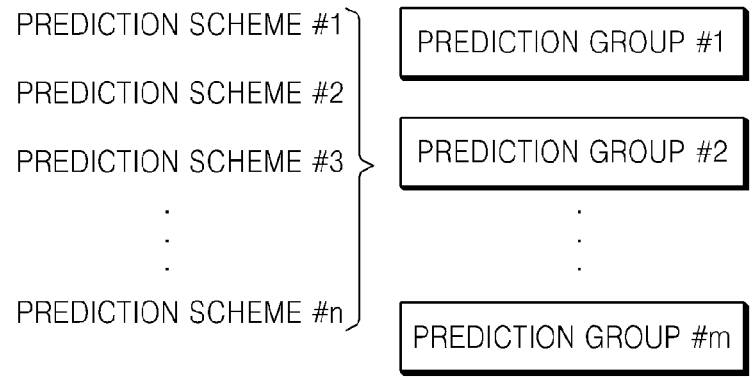
FIG. 2A is a diagram illustrating grouping of a plurality of prediction schemes according to an exemplary embodiment.

FIG. 2A is a diagram illustrating grouping of a plurality of prediction schemes according to an exemplary embodiment.

In the generation of a prediction block regarding a predetermined block for prediction encoding of an image, a plurality of prediction schemes that are different according to the size of a prediction block, which is a basic unit of prediction, and a type of prediction scheme may be used. For example, for predicting a current block having a size of 16×16 pixels, the prediction may be performed in a unit of size 16×16 or with 4 sub-blocks having a size of 8×8.

Alternatively, a plurality of prediction schemes that are different based on a type of prediction scheme, i.e., according to whether an intra prediction mode or inter prediction mode is used, may be used. Moreover, when the type of prediction scheme is the inter prediction mode, a plurality of prediction schemes that are different according to bi-directional prediction in which both temporally previous and following pictures are referred to or according to one-directional prediction in which only a temporally previous picture is referred to may be used.

The matching unit 120 generates at least one prediction group #1 to #m by grouping a plurality of prediction schemes #1 to #n in which at least one of the size of a prediction block and a type of prediction scheme is different.

For example, based on the size of a prediction block, prediction schemes in which prediction is performed with a size of 16×16 may be grouped into a prediction group #1, and prediction schemes in which prediction is performed with a size of 8×8 may be grouped into a prediction group #2.

Alternatively, based on a type of prediction scheme, prediction schemes using the intra prediction mode may be grouped into a prediction group #1, and prediction schemes using the inter prediction mode may be grouped into a prediction group #2.

Alternatively, grouping may be performed by combining the size of a prediction block and a type of prediction scheme. For example, prediction schemes using the inter prediction mode, in which prediction is performed with a size equal to or greater than 8×8, may be grouped into a prediction group #1, prediction schemes using the inter prediction mode, in which prediction is performed with a size equal to or less than 4×4, may be grouped into a prediction group #2, prediction schemes using the intra prediction mode, in which prediction is performed with a size equal to or greater than 8×8, may be grouped into a prediction group #3, and prediction schemes using the intra prediction mode, in which prediction is performed with a size equal to or less than 4×4, may be grouped into a prediction group #4.

The size of a prediction block and a type of prediction scheme, which are described above, are only exemplary of a criterion for grouping a plurality of prediction schemes, and the exemplary embodiments are not limited thereto. For example, a plurality of prediction schemes may be grouped according to whether a prediction block has a perfect rectangular form or a rectangular form.

Figure 2B:
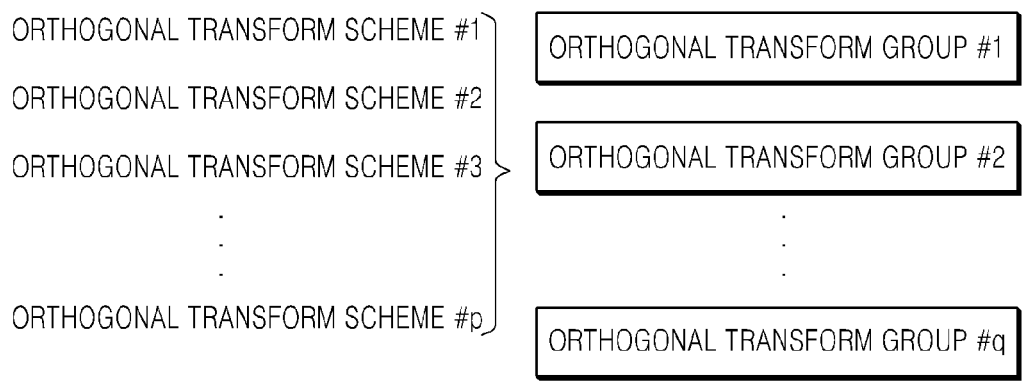
FIG. 2B is a diagram illustrating grouping of a plurality of orthogonal transform schemes according to an exemplary embodiment.

FIG. 2B is a diagram illustrating grouping of a plurality of orthogonal transform schemes according to an exemplary embodiment.

An orthogonal transform for transforming pixel values in a pixel domain into coefficients in a frequency domain also may be performed using a plurality of orthogonal transform schemes according to the size of a transform block and an orthogonal transform algorithm. For performing an orthogonal transform of a current block having a size of 16×16, the orthogonal transform may be performed in a unit of 16×16 or with 4 sub-blocks having a size of 8×8. Alternatively, a plurality of orthogonal transform schemes that are different according to an orthogonal transform algorithm, i.e., according to whether a Discrete Cosine Transform (DCT) algorithm or a Hadamard transform algorithm is used, may be used. The transform algorithm may differ according to a basis function multiplied by a block of the pixel domain for orthogonal transform.

The matching unit 120 generates at least one orthogonal transform group #1 to #q by grouping a plurality of orthogonal transform schemes #1 to #p in which at least one of the size of a transform block and a type of transform algorithm is different.

For example, based on the size of a transform block, orthogonal transform schemes in which an orthogonal transform is performed with a size of 16×16 may be grouped into an orthogonal transform group #1, and orthogonal transform schemes in which an orthogonal transform is performed with a size of 8×8 may be grouped into an orthogonal transform group #2.

Alternatively, based on an orthogonal transform algorithm, orthogonal transform schemes using a DCT may be grouped into an orthogonal transform group #1, and orthogonal transform schemes using a Hadamard transform may be grouped into an orthogonal transform group #2.

Alternatively, grouping may be performed by combining the size of a transform block and an orthogonal transform algorithm. For example, prediction schemes using a DCT, in which an orthogonal transform is performed with a size equal to or greater than 8×8, may be grouped into an orthogonal transform group #1, orthogonal transform schemes using a DCT, in which an orthogonal transform is performed with a size equal to or less than 4×4, may be grouped into an orthogonal transform group #2, orthogonal transform schemes using a Hadamard transform, in which an orthogonal transform is performed with a size equal to or greater than 8×8, may be grouped into an orthogonal transform group #3, and orthogonal transform schemes using a Hadamard transform, in which an orthogonal transform is performed with a size equal to or less than 4×4, may be grouped into an orthogonal transform group #4.

Unlike the prediction groups shown in FIG. 2A, the orthogonal transform groups shown in FIG. 2B may include the same orthogonal transform schemes. In other words, orthogonal transform schemes may be grouped so that a predetermined orthogonal transform scheme is included in both the orthogonal transform group #1 and the orthogonal transform group #2. For example, when orthogonal transform schemes are grouped so that orthogonal transform schemes using transform blocks having sizes of 16×16 and 8×8 are included in the orthogonal transform group #1 and orthogonal transform schemes using transform blocks having sizes of 8×8 and 4×4 are included in the orthogonal transform group #2, orthogonal transform schemes using a transform block having a size of 8×8 are included in both the orthogonal transform group #1 and the orthogonal transform group #2.

Figure 2C:
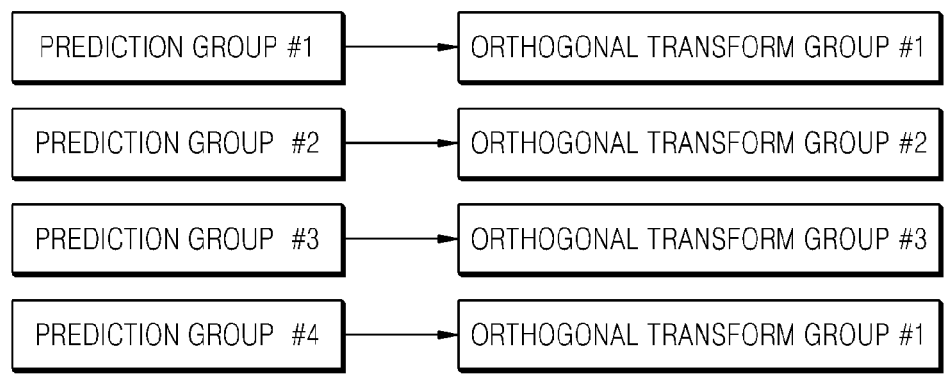
FIG. 2C is a diagram illustrating matching between at least one group on prediction and at least one group on orthogonal transform, according to an exemplary embodiment.

FIG. 2C is a diagram illustrating matching between at least one prediction group and at least one orthogonal transform group according to an exemplary embodiment.

When at least one prediction group and at least one orthogonal transform group are generated as shown in FIGS. 2A and 2B, the matching unit 120 matches the at least one prediction group to the at least one orthogonal transform group.

Referring to FIG. 2C, the matching unit 120 matches the prediction group #1 to the orthogonal transform group #1 and matches the prediction group #2 to the orthogonal transform group #2. That is, prediction groups are matched to predetermined orthogonal transform groups, respectively. However, different prediction groups may be matched to one orthogonal transform group. In the illustration shown in FIG. 2C, the prediction groups #1 and #4 are matched to the orthogonal transform group #1.

Since it is efficient that an orthogonal transform is performed using the same orthogonal transform scheme even when prediction blocks are generated using different prediction schemes, different prediction groups may be matched to one orthogonal transform group.

The matching may be performed according to various criteria. However, according to an exemplary embodiment, prediction groups may be matched to orthogonal transform groups based on the size of a prediction block and the size of a transform block. In other words, when prediction groups and orthogonal transform groups are generated based on size, groups in which the size of a prediction block is similar to the size of an orthogonal transform block are matched to each other.

For example, a prediction group including prediction schemes using prediction blocks having sizes of 16×16 and 8×8 is matched to an orthogonal transform group using an orthogonal transform block having sizes of 16×16 and 8×8. That is, an image predicted using blocks having a large size may be orthogonally transformed using blocks having a large size, and on the contrary, an image predicted using blocks having a small size may be orthogonally transformed using blocks having a small size.

FIGS. 3A to 3C illustrate syntaxes for matching between at least one prediction group and at least one orthogonal transform group, according to an exemplary embodiment.

The matching unit 120 generates at least one prediction group by grouping a plurality of prediction schemes, as shown in FIG. 2A, according to a syntax shown in FIG. 3A. In FIG. 3A, "NUM_PRED_GROUP" denotes the number of prediction groups, "NUM_PREDUNIT_IN_GROUP[n]" denotes the number of prediction schemes included in an $n^{th}$ prediction group, and "USED_PRED_UNIT[n][i]" denotes an $i^{th}$ prediction scheme of the $n^{th}$ prediction group.

The matching unit 120 generates at least one orthogonal transform group by grouping a plurality of orthogonal transform schemes, as shown in FIG. 2B, according to a syntax shown in FIG. 3B. In FIG. 3B, "NUM_TRANS_SET" denotes the number of orthogonal transform groups, "NUM_TRANS_IN_SET[n]" denotes the number of orthogonal transform schemes included in an $n^{th}$ orthogonal transform group, and "USED_TRANS_UNIT[n][i]" denotes an $i^{th}$ orthogonal transform scheme of the $n^{th}$ orthogonal transform group.

The matching unit 120 matches at least one prediction group to at least one orthogonal transform group, as shown in FIG. 2C, according to a syntax shown in FIG. 3C. In FIG. 3C, "TRANSFORM_SET_MATCHING[n]" denotes an orthogonal transform group matched to an $n^{th}$ prediction group.

According to an exemplary embodiment, the matching unit 120 may generate at least one prediction group and at least one orthogonal transform group in a unit of an image sequence, a picture, a slice, or an Instantaneous Decoding Refresh (IDR) picture and match the at least one prediction group to the at least one orthogonal transform group. When at least one prediction group and at least one orthogonal transform group are generated and matched to each other according to the syntaxes shown in FIGS. 3A to 3C, a new overhead may be generated to encode information regarding the at least one prediction group, information regarding the at least one orthogonal transform group, and information regarding matching. Thus, the matching unit 120 generates at least one prediction group and at least one orthogonal transform group in a unit of an image sequence, picture, a slice, or an IDR picture and matches the at least one prediction group to the at least one orthogonal transform group.

According to another exemplary embodiment, at least one prediction group and at least one orthogonal transform group may be generated and matched to each other in a unit of a block. However, as described above, when information regarding the at least one prediction group, information regarding the at least one orthogonal transform group, and information regarding matching are encoded in a unit of a block, a large overhead may be generated, thereby decreasing a compression ratio of image encoding. To solve this problem, at least one prediction group and at least one orthogonal transform group are generated and matched to each other in a unit of a block using information regarding a previously encoded area adjacent to a currently encoded block.

In other words, the matching unit 120 may generate at least one prediction group and at least one orthogonal transform group using at least one piece of encoding information of motion vector, motion vector difference, reference index, prediction scheme, orthogonal transform scheme, orthogonal transform coefficient, Quantization Parameter (QP), delta QP, residual value, and reference picture of at least one block included in a previously encoded area adjacent to a current block and match the at least one prediction group to the at least one orthogonal transform group.

For example, when a size of a motion vector of a block included in a previously encoded area adjacent to a current block is equal to or less than a predetermined value, it may be determined that the current block is a plane area without any motion as an adjacent block. In this case, since the probability that residual values generated as a prediction result of the current block are '0' is high, a compression ratio of image encoding may be increased by performing transform with a transform block having a large size. Thus, matching may be changed in a block unit by matching prediction groups to orthogonal transform groups including orthogonal transform schemes using a transform block having a large size.

Figure 4:
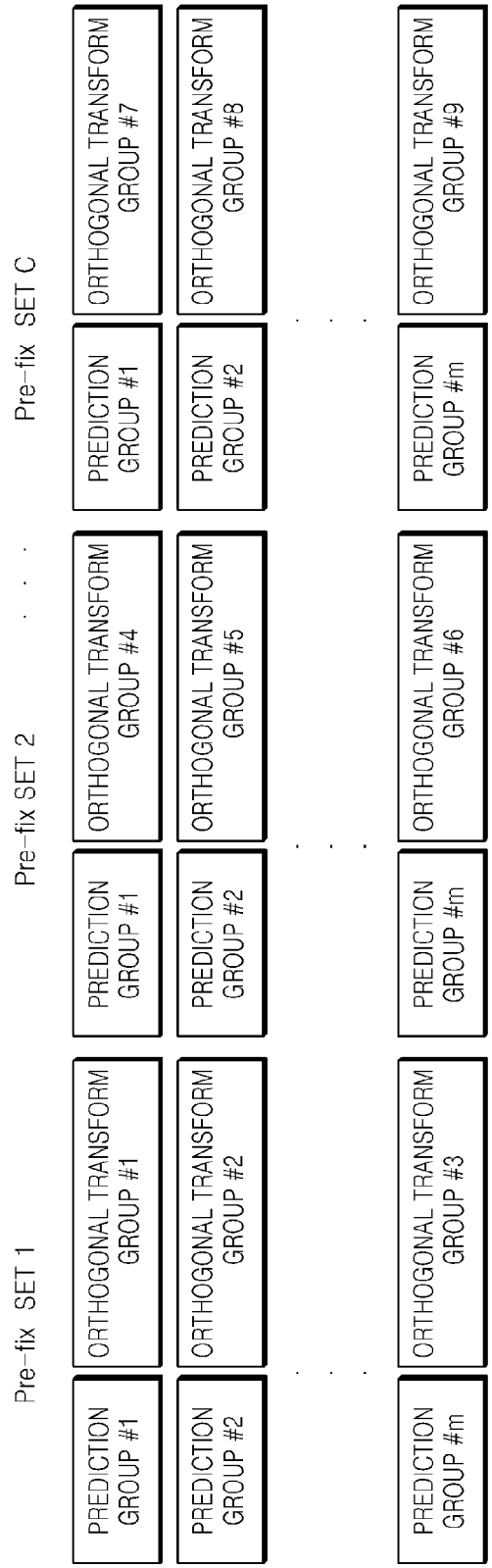
FIG. 4 is a diagram illustrating matching between at least one group on prediction and at least one group on orthogonal transform, according to another exemplary embodiment.

FIG. 4 is a diagram illustrating matching between at least one prediction group and at least one orthogonal transform group, according to another exemplary embodiment.

Referring to FIG. 4, the matching unit 120 may use previously established sets for matching at least one prediction group to at least one orthogonal transform group.

The matching unit 120 generates prediction groups and orthogonal transform groups and matches them to each other according to one of previously established "Pre-fix set 1", "Pre-fix set 2", ..., "Pre-fix set c". By generating prediction groups and orthogonal transform groups and matching them to each other according to a previously established set as shown in FIG. 4, an overhead generated to encode information regarding groups and information regarding matching may be minimized. This is because there is no need to encode the information regarding groups and the information regarding matching since a decoder may decode an image using one of the previously established sets shown in FIG. 4 only if an index indicating that prediction groups and orthogonal transform groups are matched to each other according to which one of "Pre-fix set 1", "Pre-fix set 2", ..., "Pre-fix set c" is encoded.

Referring back to FIG. 1, when the matching unit 120 matches at least one prediction group to at least one orthogonal transform group as shown in FIGS. 2A to 2C, 3A to 3C, and 4, the image encoder 110 encodes an input image under the control of the matching unit 120. The image encoder 110 receives information regarding the matching and encodes an input image based on the received information regarding the matching.

A block predicted by a prediction scheme of a predetermined prediction group is transformed using an orthogonal transform scheme of a matched orthogonal transform group. If a predetermined block k of an input image is predicted according to a prediction scheme of a prediction group #x, the block k is orthogonally transformed according to an orthogonal transform scheme of an orthogonal transform group #y matched to the prediction group #x.

In a case where at least one prediction group and at least one orthogonal transform group are matched to each other as shown in FIG. 2C, when a predetermined block of an input image is predicted using a prediction scheme included in the prediction group #4, this block is orthogonally transformed using an orthogonal transform scheme included in the orthogonal transform group #1.

Alternatively, the image encoder 110 encodes information regarding prediction groups, information regarding orthogonal transform groups, and information regarding matching between the prediction groups and the orthogonal transform groups, which are received from the matching unit 120. The syntaxes shown in FIGS. 3A to 3C may be entropy-encoded. When prediction groups and orthogonal transform groups are matched to each other using previously established sets as shown in FIG. 4, only indexes of the previously established sets may be entropy-encoded.

Figure 5:
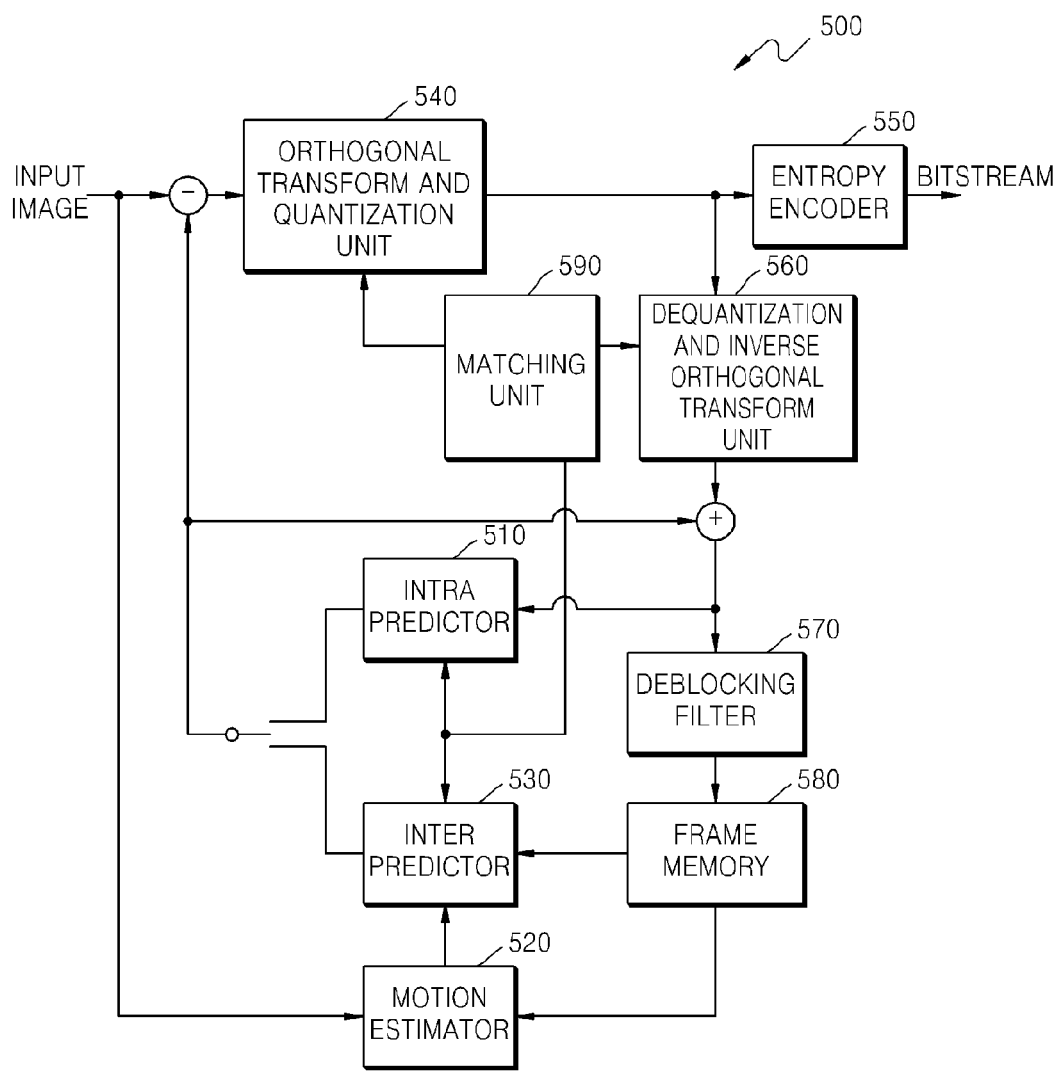
FIG. 5 is a block diagram of an image encoding apparatus according to another exemplary embodiment.

FIG. 5 is a block diagram of an image encoding apparatus 500 according to another exemplary embodiment.

Referring to FIG. 5, the image encoding apparatus 500 includes an intra predictor 510, a motion estimator 520, an inter predictor 530, an orthogonal transform and quantization unit 540, an entropy encoder 550, a dequantization and inverse orthogonal transform unit 560, a deblocking filter 570, a frame memory 580, and a matching unit 590. The matching unit 590 performs the same function as the matching unit 120 shown in FIG. 1, and the other modules 510 to 580 perform functions of the image encoder 110 shown in FIG. 1. Hereinafter, a case where the image encoding apparatus 500 encodes a current block will be described as an example.

The intra predictor 510 performs intra prediction of the current block. In more detail, the intra predictor 510 performs the intra prediction using pixel values included in a previously encoded area adjacent to the current block. In this case, the intra predictor 510 generates a prediction block by making a copy of the pixel values included in the previously encoded area adjacent to the current block in a predetermined direction.

The motion estimator 520 performs motion estimation of the current block. The motion estimator 520 searches for a block identical or similar to the current block from at least one reference picture stored in the frame memory 580 and transmits the search result to the inter predictor 530. In more detail, the motion estimator 520 searches for a block having the least Sum of Absolute Difference (SAD) than the current block from at least one reference picture. A motion vector is generated as the search result.

The inter predictor 530 performs inter prediction of the current block based on the motion estimation result of the motion estimator 520. That is, the inter predictor 530 receives the motion vector of the current block from the motion estimator 520 and performs motion compensation of the current block according to the motion vector.

When a residual block is generated by subtracting a prediction block generated by the intra predictor 510 or the inter predictor 530 from the current block, the orthogonal transform and quantization unit 540 orthogonal-transforms and quantizes the residual block. In more detail, the orthogonal transform and quantization unit 540 performs orthogonal transform of the residual block using a DCT or Hadamard transform and quantizes coefficients generated as a result of the orthogonal transform according to a predetermined quantization parameter.

The quantized coefficients are entropy-encoded by the entropy encoder 550. The entropy encoding is performed according to Context-based Adaptive Variable Length Code (CAVLC) or Context-based Adaptive Binary Arithmetic Code (CABAC).

The dequantization and inverse orthogonal transform unit 560 restores a residual block by dequantizing and inverse-orthogonal-transforming the quantized coefficients. The residual block is restored by performing the process of the orthogonal transform and quantization unit 540 in an inverse way.

By adding the restored residual block to the prediction block, the current block is restored. The restored current block is deblocking-filtered by the deblocking filter 570 and stored in the frame memory 580 in order to be used for prediction of the next picture or block.

The matching unit 590 generates prediction groups and orthogonal transform groups. Thereafter, the matching unit 590 matches at least one prediction group to at least one orthogonal transform group. It has been described that the prediction groups and the orthogonal transform groups may be generated and matched in a unit of an image sequence, a picture, a slice, or an IDR picture.

In addition, the matching unit 590 controls image encoding of other modules 510, 530, 540, and 560 based on the matching. If the current block has been predicted using one of prediction schemes of the prediction groups #x, the matching unit 590 controls the intra predictor 510, the inter predictor 530, the orthogonal transform and quantization unit 540, and the dequantization and inverse orthogonal transform unit 560 to perform orthogonal transform of the current block using one of orthogonal transform schemes of the orthogonal transform groups #y matched to the prediction groups #x.

In more detail, the matching unit 590 determines a prediction scheme of one of the prediction groups that was used to encode the current block, based on the prediction results of the intra predictor 510 and the inter predictor 530. Thereafter, the matching unit 590 controls the orthogonal transform and quantization unit 540 to perform orthogonal transform of the current block using an orthogonal transform scheme of an orthogonal transform group matched to a prediction group used for predicting the current block. In addition, the matching unit 590 controls the dequantization and inverse orthogonal transform unit 560 to perform inverse orthogonal transform by inversely performing the orthogonal transform scheme used by the orthogonal transform and quantization unit 540.

Information regarding the prediction group, information regarding the orthogonal transform group, and information regarding the matching between the prediction group and the orthogonal transform group, which are generated by the matching unit 590, are entropy-encoded by the entropy encoder 550 and inserted into a bitstream.

Figure 6:
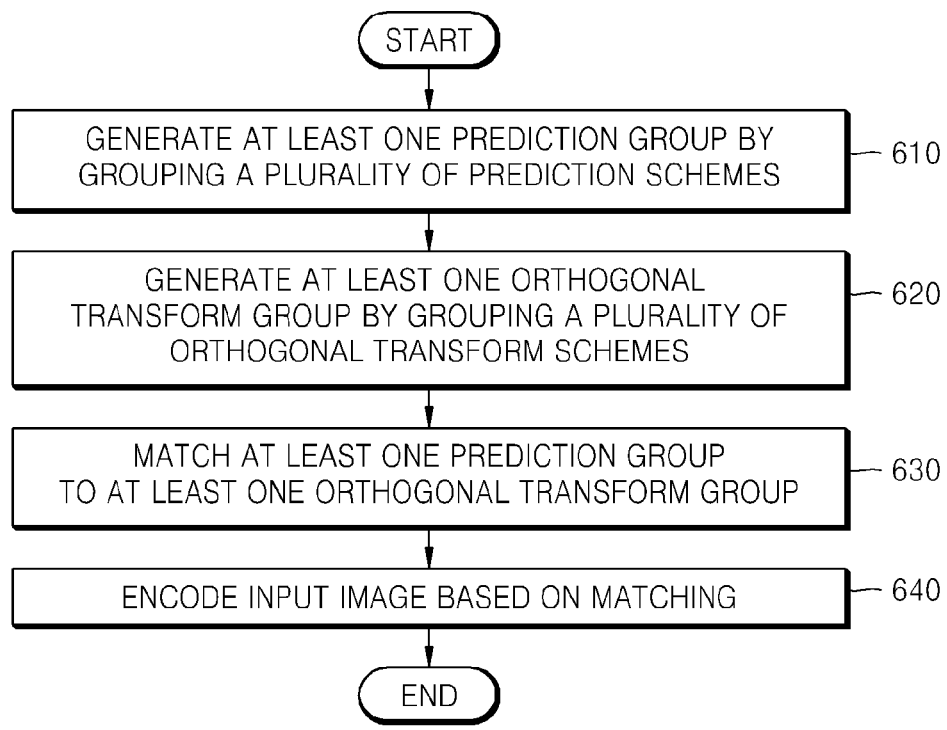
FIG. 6 is a flowchart of an image encoding method according to an exemplary embodiment.

FIG. 6 is a flowchart of an image encoding method according to an exemplary embodiment.

Referring to FIG. 6, in operation 610, the image encoding apparatus 100 or 500 according to an exemplary embodiment generates at least one prediction group by grouping a plurality of prediction schemes. A method and syntax for generating the at least one prediction group have been described with reference to FIGS. 2A and 3A.

In operation 620, the image encoding apparatus 100 or 500 generates at least one orthogonal transform group by grouping a plurality of orthogonal transform schemes. Herein, one orthogonal transform scheme may be included in different orthogonal transform groups. A method and syntax for generating the at least one orthogonal transform group have been described with reference to FIGS. 2B and 3B.

In operation 630, the image encoding apparatus 100 or 500 matches the at least one prediction group generated in operation 610 to the at least one orthogonal transform group generated in operation 620. Herein, one orthogonal transform group may be matched to different prediction groups. A method and syntax for matching between the at least one prediction group and the at least one orthogonal transform group have been described with reference to FIGS. 2C and 3C.

In operation 640, the image encoding apparatus 100 or 500 encodes an input image based on the matching between the at least one prediction group and the at least one orthogonal transform group performed in operation 630. For example, the image encoding apparatus 100 or 500 encodes the input image in a unit of a block by performing orthogonal transform of a predetermined block, which has been encoded using a prediction scheme of the prediction group #x, using an orthogonal transform scheme of the orthogonal transform group #y matched to the prediction group #x.

Operations 610 to 630 of generating and matching prediction groups and orthogonal transform groups may be performed in a unit of an image sequence, a picture, a slice, and an IDR picture. Alternatively, operations 610 to 630 of generating and matching prediction groups and orthogonal transform groups may be performed in a unit of a block by using additional information of a previously encoded area adjacent to a predetermined block.

Figure 7:
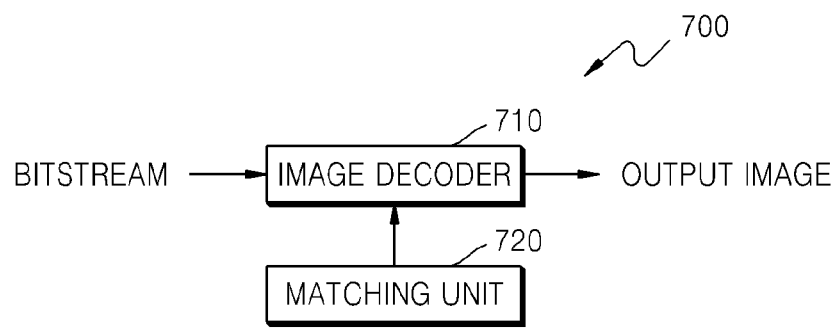
FIG. 7 is a block diagram of an image decoding apparatus according to an exemplary embodiment.

FIG. 7 is a block diagram of an image decoding apparatus 700 according to an exemplary embodiment.

Referring to FIG. 7, the image decoding apparatus 700 includes an image decoder 710 and a matching unit 720.

The image decoder 710 restores an output image by receiving a bitstream and decoding the received bitstream. In more detail, the image decoder 710 restores an output image based on matching between at least one prediction group and at least one orthogonal transform group included in the bitstream, under the control of the matching unit 720. The image decoder 710 performs the image encoding process of the image decoder 110 shown in FIG. 1, which has been described above, in an inverse way. For example, the image decoder 710 restores the output image in a unit of a block by predicting a block, which has been inverse-orthogonally transformed in an orthogonal transform scheme of the orthogonal transform group #y, using a prediction scheme of the prediction group #x matched to the orthogonal transform group #y.

The matching unit 720 controls the image decoder 710 based on information regarding the at least one prediction group, information regarding the at least one orthogonal transform group, and information regarding matching between the at least one prediction group and the at least one orthogonal transform group, which are included in the bitstream.

The at least one prediction group may be a group generated by grouping a plurality of prediction schemes based on at least one of the size of a prediction block and a type of prediction scheme, and the at least one orthogonal transform group may be a group generated by grouping a plurality of orthogonal transform schemes based on at least one of the size of a transform block and a transform algorithm.

The information regarding matching is information generated according to the method described above with reference to FIGS. 2A to 2C and 3A to 3C and may be information generated by matching the at least one prediction group to the at least one orthogonal transform group based on the size of a prediction block and the size of a transform block.

The information regarding matching may be information generated in a unit of an image sequence, a picture, a slice, or an IDR picture and may be information generated in a unit of a block using additional information of a previously encoded area adjacent to a current block.

Figure 8:
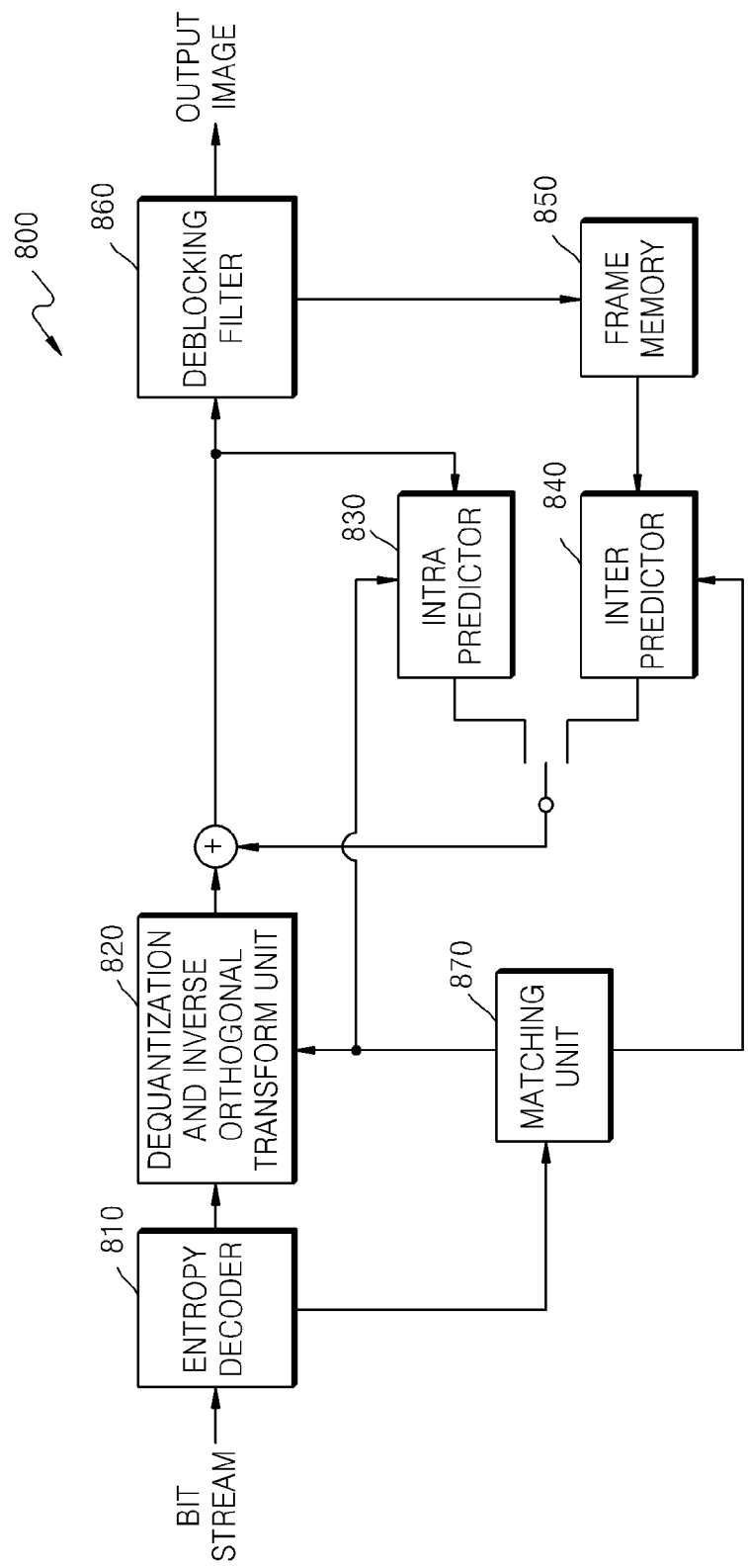
FIG. 8 is a block diagram of an image decoding apparatus according to another exemplary embodiment.

FIG. 8 is a block diagram of an image decoding apparatus 800 according to another exemplary embodiment.

Referring to FIG. 8, the image decoding apparatus 800 includes an entropy decoder 810, a dequantization and inverse orthogonal transform unit 820, an intra predictor 830, an inter predictor 840, a frame memory 850, a deblocking filter 860, and a matching unit 870. The matching unit 870 performs the same function as the matching unit 720 shown in FIG. 7, and the other modules 810 to 860 perform functions of the image decoder 710 shown in FIG. 7. Hereinafter, since the image decoding apparatus 800 also processes an image in a unit of a block as the image encoding apparatus 500 in FIG. 5, a case where the image decoding apparatus 800 decodes a current block will be described as an example.

The entropy decoder 810 receives a bitstream and performs entropy decoding of the received bitstream. That is, the entropy decoder 810 performs entropy decoding of orthogonal transform coefficients of the current block. In addition, information regarding at least one prediction group, information regarding at least one orthogonal transform group, and information regarding matching between the at least one prediction group and the at least one orthogonal transform group may be entropy-decoded. The information regarding matching between the at least one prediction group and the at least one orthogonal transform group may be entropy-decoded in a unit of an image sequence, a picture, a slice, or an IDR picture.

The dequantization and inverse orthogonal transform unit 820 dequantizes the orthogonal transform coefficients entropy-decoded by the entropy decoder 810 and performs inverse orthogonal transform of the dequantized orthogonal transform coefficients. In more detail, the dequantization and inverse orthogonal transform unit 820 restores residual values of the current block by dequantizing the orthogonal transform coefficients according to a predetermined quantization parameter and performing DCT or Hadamard transform in an inverse way for the dequantized orthogonal transform coefficients.

The intra predictor 830 performs intra prediction using pixel values included in a previously encoded area adjacent to the current block. In this case, the intra predictor 830 generates a prediction block by making a copy of the pixel values included in the previously encoded area adjacent to the current block in a predetermined direction. The inter predictor 840 performs inter prediction of the current block by searching a reference picture stored in the frame memory 850 based on a motion vector of the current block. A prediction block of the current block, which has been generated by the intra predictor 830 or the inter predictor 840, is added to a residual block generated by the dequantization and inverse orthogonal transform unit 820.

The deblocking filter 860 performs deblocking filtering of a block generated by adding the prediction block to the residual block. That is, the deblocking filter 860 removes blocking artifacts by filtering a border between blocks using a predetermined filter. The deblocking-filtered current block is stored in the frame memory 850 in order to be used for prediction of the next picture or block.

The matching unit 870 receives the information regarding at least one prediction group, the information regarding at least one orthogonal transform group, and the information regarding matching between the at least one prediction group and the at least one orthogonal transform group, which has been entropy-decoded by the entropy decoder 810, and controls decoding of other blocks 820 to 840 based on the information regarding matching. For example, if the current block has been inverse-orthogonally transformed using one of the orthogonal transform schemes of the orthogonal transform group #y, the matching unit 870 controls the dequantization and inverse orthogonal transform unit 820, the intra predictor 830, and the inter predictor 840 to predict the current block using a prediction scheme of the prediction group #x matched to the orthogonal transform group #y.

Figure 9:
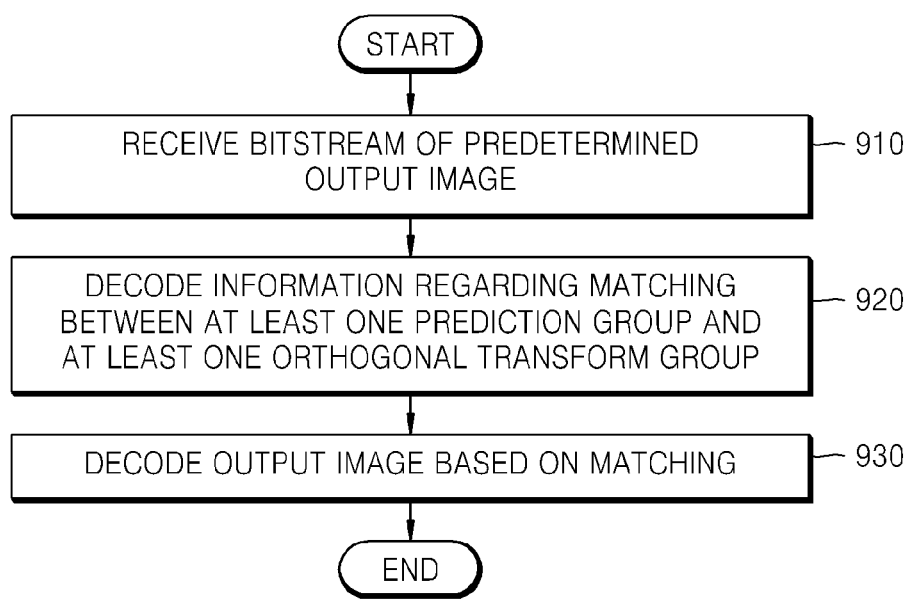
FIG. 9 is a flowchart of an image decoding method according to an exemplary embodiment.

FIG. 9 is a flowchart of an image decoding method according to an exemplary embodiment.

Referring to FIG. 9, an image decoding apparatus according to an exemplary embodiment receives a bitstream of a predetermined output image, in operation 910.

In operation 920, the image decoding apparatus decodes information regarding matching between at least one prediction group and at least one orthogonal transform group, which is included in the bitstream received in operation 910.

In operation 930, the image decoding apparatus decodes the output image based on the information regarding matching, which has been decoded in operation 920. For example, the output image is decoded by predicting a block, which has been inverse-orthogonally transformed using an orthogonal transform scheme of the orthogonal transform group #y, using a prediction scheme of the prediction group #x matched to the orthogonal transform group #y.

According to an exemplary embodiment, while encoding an image by variously combining prediction schemes and orthogonal transform schemes, information regarding matching between the prediction schemes and the orthogonal transform schemes may be encoded using a smaller number of bits, thereby increasing a compression ratio of the image encoding.

While the exemplary embodiments have been particularly shown and described with reference to the exemplary embodiments thereof, it will be understood by those of ordinary skill in the art that various changes in form and details may be made therein without departing from the spirit and scope of the exemplary embodiments as defined by the following claims. In addition, a system according to the exemplary embodiments may be implemented using a computer readable code in a computer readable recording medium.

For example, an image encoding apparatus and an image decoding apparatus according to exemplary embodiments may include a bus coupled to each of the units of the apparatuses shown in FIGS. 1, 5, 7, and 8 and at least one processor connected to the bus. In addition, a memory, which is coupled to at least one processor for performing commands as described above in connection with the bus to store the commands and received messages or generated messages, may be included.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

What is claimed is:

1. A method for encoding an image, the method comprising:
  generating at least one prediction group by grouping a plurality of prediction schemes;
    generating at least one orthogonal transform group by grouping a plurality of orthogonal transform schemes;
    matching the at least one prediction group to the at least one orthogonal transform group; and
    encoding an input image, based on the matching, by transforming a block predicted by a prediction scheme of a predetermined prediction group using an orthogonal transform scheme of an orthogonal transform group, which is matched to the predetermined prediction group.

2. The method of claim 1, wherein the generating of the at least one prediction group comprises generating the at least one prediction group by grouping the plurality of prediction schemes based on at least one of a size of a prediction block and a type of prediction scheme.

3. The method of claim 2, wherein the type of prediction scheme comprises at least one of intra prediction and inter prediction.

4. The method of claim 2, wherein the generating of the at least one orthogonal transform group comprises generating the at least one orthogonal transform group by grouping the plurality of orthogonal transform schemes based on at least one of a size of a transform block and a transform algorithm.

5. The method of claim 4, wherein the transform algorithm comprises at least one of a Discrete Cosine Transform (DCT) and a Hadamard transform.

6. The method of claim 4, wherein the matching comprises matching the at least one prediction group to the at least one orthogonal transform group based on the size of the prediction block and the size of the transform block.

7. The method of claim 1, wherein the matching is performed in a unit of an image sequence, a picture, a slice, or an Instantaneous Decoding Refresh (IDR) picture.

8. The method of claim 1, wherein the encoding comprises encoding information regarding matching between the at least one prediction group and the at least one orthogonal transform group.

9. A method for decoding an image, the method comprising:
receiving a bitstream of a predetermined output image;
decoding information regarding matching between at least one prediction group and at least one orthogonal transform group; and
decoding the output image by predicting a block inverse-orthogonally transformed by a transform scheme of a predetermined orthogonal transform group using a prediction scheme of a matched prediction group based on the matching.

10. The method of claim 9, wherein the at least one prediction group is at least one group generated by grouping the plurality of prediction schemes based on at least one of a size of a prediction block and a type of prediction scheme.

11. The method of claim 10, wherein the type of prediction scheme comprises at least one of intra prediction and inter prediction.

12. The method of claim 10, wherein the at least one orthogonal transform group is at least one group generated by grouping the plurality of orthogonal transform schemes based on at least one of the size of a transform block and a transform algorithm.

13. The method of claim 12, wherein the transform algorithm comprises at least one of a Discrete Cosine Transform (DCT) and a Hadamard transform.

14. The method of claim 12, wherein information regarding the matching is generated by matching the at least one prediction group to the at least one orthogonal transform group based on the size of the prediction block and the size of the transform block.

15. The method of claim 9, wherein the information regarding matching is generated in a unit of an image sequence, a picture, a slice, or an Instantaneous Decoding Refresh (IDR) picture.

16. An apparatus for encoding an image, the apparatus comprising:
an image encoder for encoding an input image; and
a matching unit which matches at least one prediction group to at least one orthogonal transform group and controls the image encoder to encode the input image by transforming a block predicted by a prediction scheme of a predetermined prediction group using an orthogonal transform scheme of an orthogonal transform group, which is matched to the predetermined prediction group, based on the matching.

17. The apparatus of claim 16, wherein the matching unit performs the matching in a unit of an image sequence, a picture, a slice, or an Instantaneous Decoding Refresh (IDR) picture.

18. An apparatus for decoding an image, the apparatus comprising:
an image decoder which decodes a bitstream of an output image; and
a matching unit which controls the decoder to decode the output image by predicting a block inverse-orthogonally transformed by a transform scheme of a predetermined orthogonal transform group using a prediction scheme of a matched prediction group based on information regarding matching between at least one prediction group and at least one orthogonal transform group, which are included in the bitstream.

19. The apparatus of claim 18, wherein the information regarding matching is generated in a unit of an image sequence, a picture, a slice, or an Instantaneous Decoding Refresh (IDR) picture.

20. A non-transitory computer readable recording medium having embodied thereon a computer readable program for executing a method for encoding an image, the method comprising:
generating at least one prediction group by grouping a plurality of prediction schemes;
generating at least one orthogonal transform group by grouping a plurality of orthogonal transform schemes;
matching the at least one prediction group to the at least one orthogonal transform group; and
encoding an input image, based on the matching, by transforming a block predicted by a prediction scheme of a predetermined prediction group using an orthogonal transform scheme of an orthogonal transform group, which is matched to the predetermined prediction group.

21. A non-transitory computer readable recording medium having embodied thereon a computer readable program for executing method for decoding an image, the method comprising:
receiving a bitstream of a predetermined output image;
decoding information regarding matching between at least one prediction group and at least one orthogonal transform group; and
decoding the output image by predicting a block inverse-orthogonally transformed by a transform scheme of a predetermined orthogonal transform group using a prediction scheme of a matched prediction group based on the matching.

* * * * *